United States Patent [19]
Speicher

[11] Patent Number: 5,357,180
[45] Date of Patent: Oct. 18, 1994

[54] COMPOSITE ROTATING MACHINE

[76] Inventor: Marcus E. Speicher, 1004 N. Walnut Ave., Celina, Ohio 45822

[21] Appl. No.: 928,338

[22] Filed: Aug. 12, 1992

[51] Int. Cl.$^5$ .............................................. H02K 16/00
[52] U.S. Cl. ........................................ 318/49; 310/114
[58] Field of Search ....................... 318/41, 44, 49, 34, 318/77, 83, 113, 46, 538, 539, 48; 310/112, 113, 114, 115, 118, 124, 125, 122, 8

[56] References Cited

U.S. PATENT DOCUMENTS

| | | | |
|---|---|---|---|
| 1,822,369 | 9/1931 | Ossanna et al. ................... | 318/49 X |
| 2,061,983 | 11/1936 | Rossman ............................ | 318/47 |
| 2,864,017 | 12/1958 | Waltscheff . | |
| 3,344,295 | 9/1967 | Toyohara et al. . | |
| 3,379,945 | 4/1968 | Mitchell et al. ................... | 318/49 |
| 3,586,938 | 6/1971 | Legall .............................. | 310/112 X |
| 3,675,060 | 7/1972 | Hills . | |
| 3,683,217 | 8/1972 | Agalakov et al. . | |
| 4,082,973 | 4/1978 | Schiethart . | |
| 4,087,698 | 5/1978 | Myers ............................. | 310/122 X |
| 4,222,512 | 9/1980 | Bugnone ......................... | 318/49 X |
| 4,373,147 | 2/1983 | Carlson, Jr. ..................... | 318/48 |
| 4,375,047 | 2/1983 | Nelson et al. ................... | 318/48 |
| 4,755,700 | 7/1988 | Yongning et al. ................. | 310/114 |
| 4,761,588 | 8/1988 | Youcef-Toumi et al. .......... | 318/46 |
| 4,882,513 | 11/1989 | Flygare et al. ................... | 310/114 |
| 5,012,170 | 4/1991 | Atlas ............................... | 318/49 X |
| 5,200,659 | 4/1993 | Clarke ............................. | 310/112 |

Primary Examiner—Jonathan Wysocki
Attorney, Agent, or Firm—Henry M. Bissell

[57] ABSTRACT

An electrical composite rotating machine capable of developing output shaft speeds in excess of the synchronous speed of a single motor without resort to gearing or frequency changers. An a-c electric motor is equipped with a rotor which is at one end connected to a rotatable field structure of a second motor. When the first two-pole motor operates at a nominal shaft speed of 3600 rpm, it also drives the field structure of the second motor at 3600 rpm. When the field of the second two-pole motor is activated, the rotor of the second motor rotates at a speed of 3600 rpm relative to its field structure, thus developing an output speed of 7200 rpm. With different numbers of poles in the respective motors, different shaft output speeds can be achieved.

17 Claims, 3 Drawing Sheets

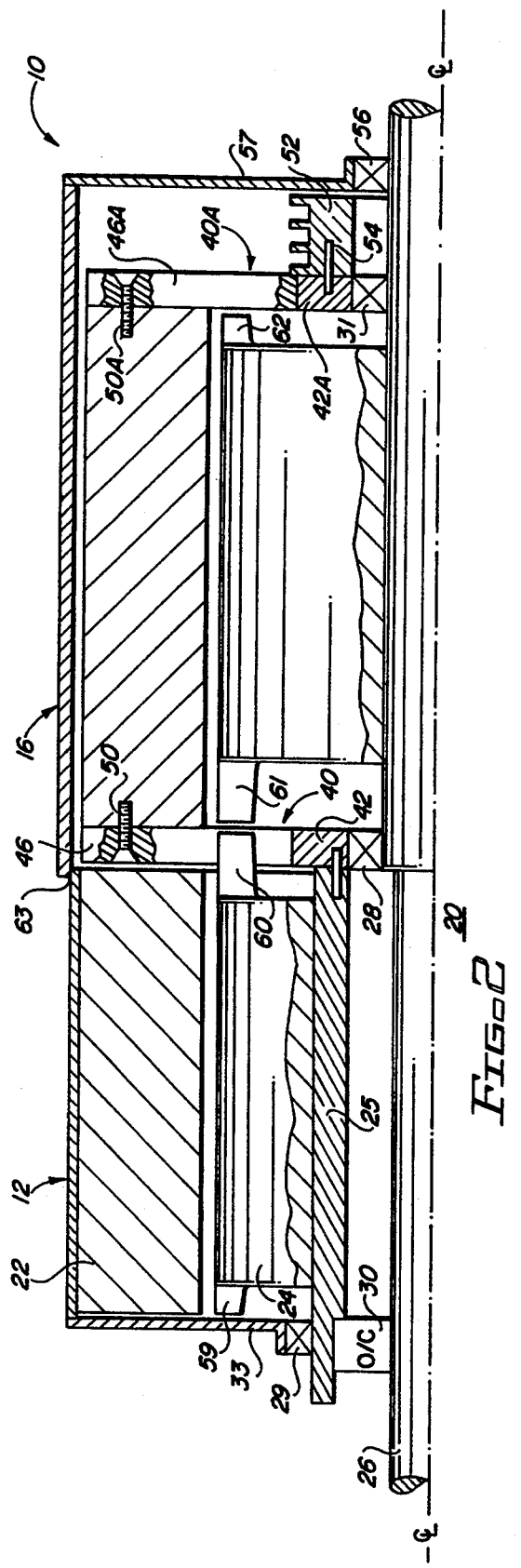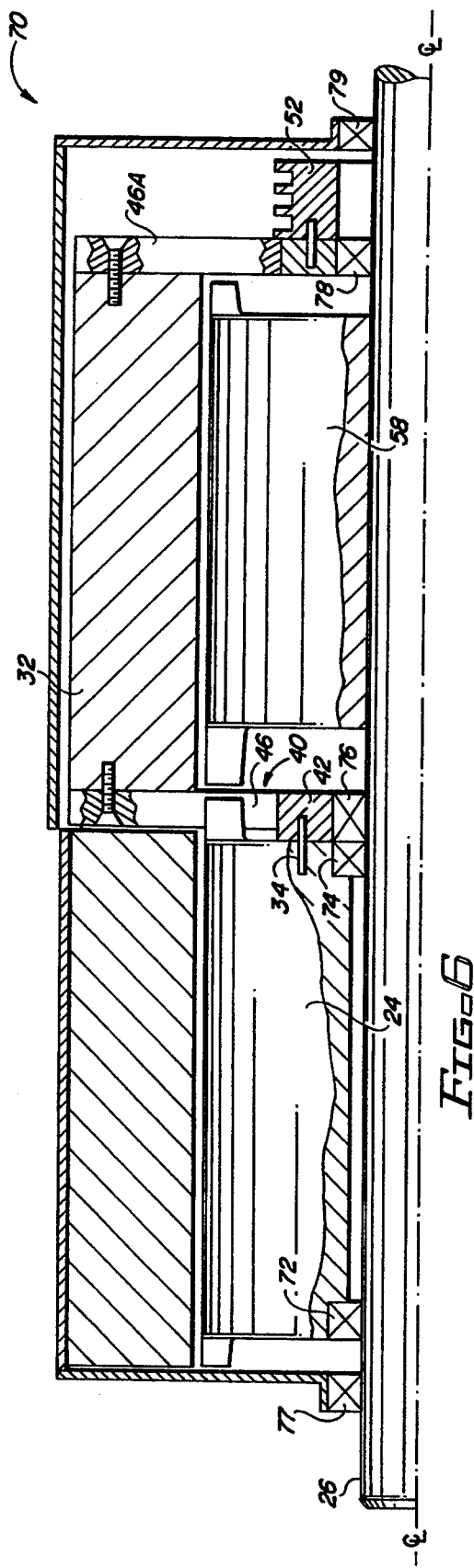

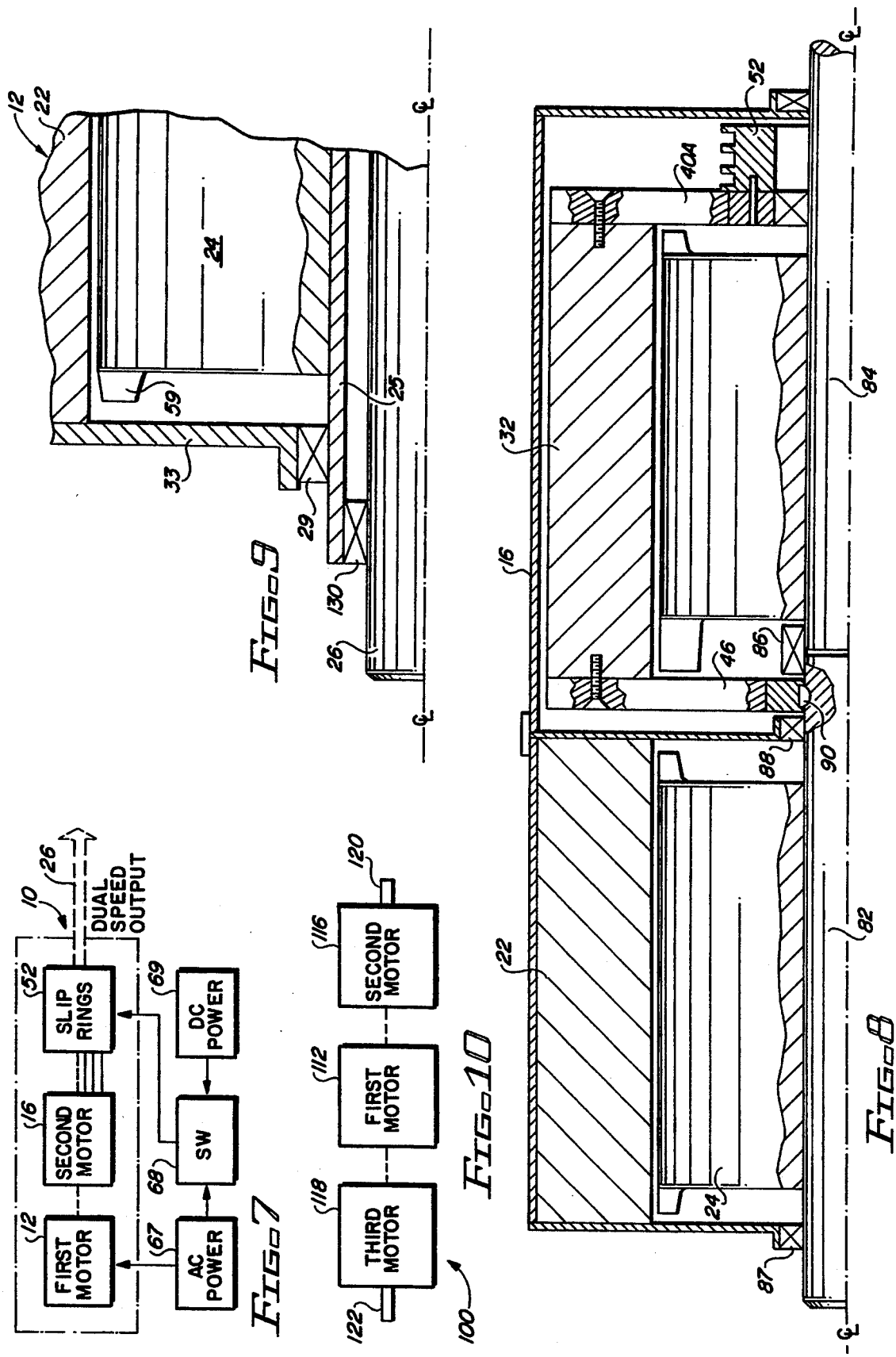

COMPOSITE ROTATING MACHINE

BACKGROUND OF THE INVENTION

1. Field of the Invention

This invention relates to induction motors generally and, more particularly, to induction motors capable of developing nominal operating speeds in excess of 3600 rpm from 60-cycle a-c power.

2. Description of the Related Art

Conventional two-pole induction motors powered by 60-cycle a-c (alternating current) have a maximum nominal speed of 3600 rpm. These motors are driven by a rotating electromagnetic field, the velocity of which is a function of the frequency of applied power and the number of poles for which the stator is wound. For a two-pole motor, the rotating field makes one complete revolution in one cycle of the current. For a motor that is wound for p poles, the rotating field moves past one pair of poles in one cycle. With a frequency of f cycles per second for the applied power, the rotating field travels at f cycles per second divided by p/2 cycles per revolution equals 2f/p revolutions per second. The speed of rotation of the rotating field is the synchronous speed $n_s$ of the motor. Since this is usually expressed in revolutions per minute, the formula for the synchronous speed is as follows:

$$n_s = 60 \text{ (sec./min.)} \times 2f/p = 120 \ f/p \qquad (1)$$

The highest synchronous speed obtainable is that for a two-pole motor. Putting the numbers for a 2-pole, 60-cycle motor in Equation (1) yields:

$$n_s = 120 \times 60/2 = 3600 \text{ rpm} \qquad (2)$$

For a four-pole, 60-cycle motor, the synchronous speed is 1800 rpm; for a six-pole, 60-cycle motor, the synchronous speed is 1200 rpm, etc. Whereas synchronous motors generally operate at synchronous speed, induction motors usually develop a slippage under load so that a four-pole induction motor having a nominal speed of 1800 rpm commonly operates at about 1760 to 1780 rpm.

Insofar as is known, attempts to develop rotational shaft speed in excess of synchronous speed for alternating current induction motors have not been successful. A motor with multiple rotors is the subject of U.S. Pat. No. 2,864,017 to Waltscheff. The Waltscheff apparatus uses one conventional rotor, one or more intermediate rotors, torque-increasing gears and one or more clutches. The movement of the additional rotor or rotors of the Waltscheff apparatus serves to transmit the rotation of the additional rotor or rotors through over-running clutches and gears to the main rotor in order to increase the main rotor's torque. However, the speed of the output shaft is no greater than that of a conventional single-rotor machine.

Arrangements in accordance with the present invention are capable of developing output shaft speeds in excess of 3600 rpm from 60-cycle a-c power through the use of multiple rotors, one of which is coupled to drive what becomes a rotating "stator" (rotating field structure) for a second rotor which drives the output shaft. U.S. Pat. No. 3,683,217 of Agalakov et al discloses an electric motor which has a plurality of rotor cores. However, it appears that these are fastened together so that they rotate as a single rotor and do not increase shaft speed.

SUMMARY OF THE INVENTION

In brief, arrangements in accordance with the present invention comprise a composite rotating machine which may be thought of as a pair of motors combined in a single unit. The first motor of the combination is relatively conventional in construction, having a cylindrical frame or housing, a stator winding installed within the housing and a rotor mounted on bearings to rotate within the housing, driven by fields developed by currents flowing in the stator windings. In a preferred embodiment, this rotor is of the squirrel cage type driven by an induced field without the need for slip rings.

The second part of the composite rotating machine operates as a motor but is not of the conventional type. Its "stator" is a rotating field structure which is supported on bearings and is fastened to the rotor of the first motor so as to be rotationally driven thereby. Power is applied to windings of this rotating field structure by means of slip rings and contacts in conventional fashion. Mounted for rotation inside the bore of the rotating field structure is a second rotor, also of the squirrel cage type, which is driven rotationally by field forces induced from the fields in the rotating field structure. In a preferred embodiment, the output shaft is coupled to the second rotor for rotation therewith at the speed developed by the second rotor.

Considering the embodiment of a dual two-pole machine, the first rotor is driven in conventional fashion by the induced fields of the induction motor, operating on 60 cycle power, and thus develops a nominal rotational speed of 3600 rpm. Since the rotational field structure is coupled to the first rotor, it also rotates at the same nominal speed of 3600 rpm. The second rotor rotates relative to the rotational field structure at a nominal speed of 3600 rpm higher than the speed of the rotational field structure, in this case a nominal 7200 rpm.

Preferably, the rotating machine of this invention is constructed with three-phase windings for operating on three-phase, 60 cycle power. For a dual two-pole motor as just described, the output shaft speed (if driven by the second rotor) is nominally 7200 rpm. If the output shaft is driven by the first rotor, although there would be little benefit to this, the output shaft speed is nominally 3600 rpm. It is possible, however, with certain arrangements in accordance with the present invention to have the output shaft selectively driven at either of the two nominal output speeds mentioned above. In one particular embodiment of this concept, an over-running clutch is used to couple the first rotor to the motor shaft. In this arrangement, activation of the first motor without energization of the windings of the rotating field structure results in the shaft being driven at a nominal 3600 rpm. When the rotating field structure windings are energized, however, the second rotor takes over and drives the shaft at a nominal 7200 rpm.

In another embodiment of the invention, the same result is achieved without resort to an over-running clutch by the selective application of d-c or a-c power to the windings of the rotating field structure. In this embodiment, there is no mechanical driving relationship between the first rotor and the shaft; the rotor merely rotates on the shaft, mounted on support bearings, while the second rotor is directly coupled to the common shaft extending through the composite machine. Applying a-c power to the windings of the rotating field structure with the first rotor rotating at 3600 rpm results in the output shaft being driven at a nominal 7200 rpm. However, when d-c power is applied to the windings of the rotating field structure, the second rotor locks rotation with the rotating field structure and is thus driven at a nominal 3600 rpm.

In still another embodiment of the present invention, applying the principles just described with respect to speed control, a dual shaft, dual speed motor is provided. In this particular arrangement, each rotor is directly coupled to its corresponding shaft so that it drives the shaft at rotor speed. The end of one shaft extends from one end of the motor for mounting a pulley or sprocket thereon; the output end of the other shaft extends from the other end of the motor for a similar purpose. The rotating field structure of the second motor is still driven at the rotational speed of the first rotor. The following Table shows some of the nominal output speeds which can be achieved with such an arrangement.

TABLE I

| 1st Rotor | | 2nd Rotor | |
|---|---|---|---|
| # of poles | $n_{s1}$ | # of poles | $n_{s2}$ |
| 2 | 3600 | 2 | 7200 |
| 4 | 1800 | 2 | 5400 |
| 6 | 1200 | 2 | 4800 |
| 2 | 3600 | 4 | 5400 |
| 2 | 3600 | 6 | 4800 |
| 4 | 1800 | 4 | 3600 |
| 6 | 1200 | 6 | 2400 |
| 8 | 900 | 2 | 4500 |
| 8 | 900 | 4 | 2700 |
| 8 | 900 | 6 | 2100 |
| 8 | 900 | 8 | 1800 |
| 6 | 1200 | 4 | 3000 |
| 12 | 600 | 2 | 4200 |

Other shaft output speeds can be achieved, following the examples shown in Table I. Some of these speed combinations are of little interest because they match speeds which are attainable with conventional motors. For example, the combination listed in Table I for dual 8-pole motors, if used in a single shaft, dual composite machine, would be largely academic because the 1800 rpm shaft speed is the same as the output speed of a four-pole 60 cycle motor.

Similarly, there are other shaft speed combinations attainable if the energization of the field windings of the rotating field structure is such as to develop rotation of the second rotor in the opposite direction from that of the first rotor. In this case, the speed of the second rotor, relative to the rotating field structure, subtracts from the rotational speed of the first rotor (and the rotational field structure), rather than adding to it. In some instances, the results are largely trivial, because the same speeds can be achieved with conventional motors. However, there are possible combinations of rotors, shafts, and energization schemes in accordance with the invention which can provide shaft speeds different from those listed in Table I. For example, a three-motor combination may produce the output speeds listed in Table II:

TABLE II

| 1st Rotor | | 2nd Rotor | | 3rd Rotor (opposite rotation) | |
|---|---|---|---|---|---|
| # of poles | $n_{s1}$ | # of poles | $n_{s2}$ | # of poles | $n_{s3}$ |
| 2 | 3600 | 4 | 5400 | 4 | 1800 |
| 2 | 3600 | 6 | 4800 | 6 | 2400 |
| 2 | 3600 | 8 | 4500 | 8 | 2700 |

Such results can be attained by coupling three units together in the manner described hereinabove for the dual composite machine of the present invention, with one of the units having its rotor energized to rotate in the opposite direction. In such an arrangement, the primary rotor would be coupled to drive rotating field structures at both ends of the primary unit which in turn would produce the output shaft speeds specified in Table II.

BRIEF DESCRIPTION OF THE DRAWINGS

A better understanding of the present invention may be realized from a consideration of the following detailed description, taken in conjunction with the accompanying drawings, in which:

FIG. 2 is a quarter-sectional view, partially broken away, of one particular embodiment of the invention;

FIG. 6 is a quarter-sectional view, partially broken away, of another embodiment of the present invention;

FIG. 7 is a schematic block diagram of a control system in accordance with the present invention for operating one embodiment of the invention at two different speeds;

FIG. 8 is a schematic sectional view, partially broken away and in quarter section, of still another embodiment of the invention;

FIG. 9 is a schematic partial view, like that of FIG. 2, illustrating a particular feature of that embodiment; and FIG. 10 is a schematic block diagram of still another embodiment of my invention.

DETAILED DESCRIPTION OF THE PREFERRED EMBODIMENTS

Figure 1:
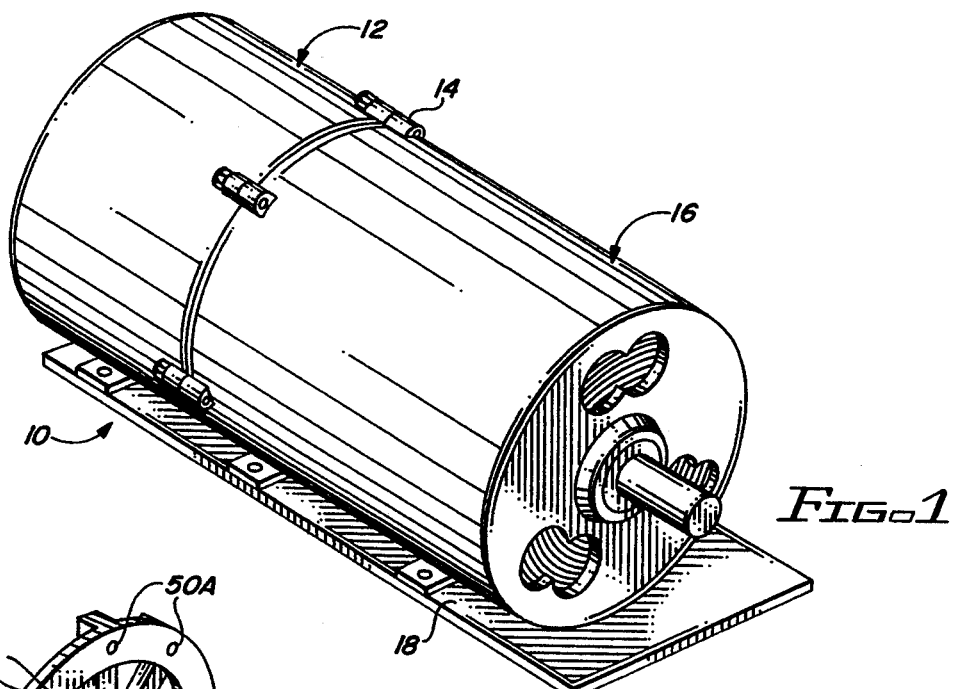
FIG. 1 is a perspective view of a composite motor housing in which particular arrangements in accordance with the invention may be installed.

The present invention will be described in greater detail by reference to the drawing figures. FIG. 1 shows a perspective view of a composite motor housing 10. The housing comprises a cylindrical first housing part 12, connected with suitable clamps 14 or otherwise to a second housing part 16, both housing parts being mounted on and supported by a base plate 18. Contained in the composite housing are the two motors that constitute the composite rotating machine as described in detail below.

Figure 5:
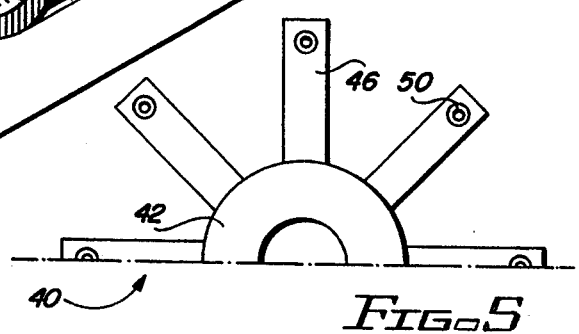
FIG. 5 is a schematic sketch representing a mounting member which is also employed in preferred embodiments of the invention.

FIG. 2 is a quarter-sectional view, partially broken away, of a first embodiment 20 of the invention. Mounted in the first housing part 12 in conventional fashion is a wound stator 22. Mounted for rotation inside the bore of the stator 22 is a first rotor 24 affixed to a cylindrical sleeve 25 which is supported by bearings 28 and 29 and an over-running clutch 30. The over-running clutch 30 enables the rotor 24 and sleeve 25 to drive the shaft 26 at rotor speed, but permits the shaft 26 to rotate at a higher speed when driven by the motor of the second housing portion 16. The first rotor 24 is of the squirrel cage type, driven by an induced field from the stator 22. The rotor 24 is mounted on a sleeve 25 which is supported at one end between the over-running clutch 30, installed on the central shaft 26, and the bearing 29 which is installed in an end plate 33 of the housing portion 12. At the other end, the sleeve 25 is connected to a spoked mounting member 40 (see FIG. 5) which is supported on the shaft 26 by the bearing 28. The rotor 24 is provided, in conventional fashion, with blower blades or fins 59, 60 at opposite ends thereof to develop circulation of air as it rotates. The inboard blades 60 fit between individual spokes 46 of the support member 40.

The second motor of the composite rotating machine 10 is contained within the second housing part 16. The second motor has a rotatable field structure 32 in place of a conventional stator. The rotational field structure 32 is connected to the spokes 46 of the mounting member 40 by means of fasteners, such as the screws 50, the hub 42 of the mounting member being attached for rotation with the sleeve 25 and rotor 24 of the first motor. A similar spoked mounting member 40A with spokes 46A extending outwardly from a hub 42A is positioned at the right-hand end of the rotating field structure 32, affixed thereto by a plurality of screws 50A. The mounting member 40A is supported for rotation on the shaft 26 by a bearing 31. The mounting member 40A supports a slip-ring member 52 which is shown attached to the hub 42A by a plurality of pins 54. Electrical power is applied to the rotating field structure 32 through the slip-rings of member 52 via brushes or wiper arms (not shown) in conventional fashion.

Affixed to the shaft 26 in driving relationship therewith is a second rotor 58. Like the first rotor 24, the second rotor 58 is provided with blower blades 61, 62 to develop air circulation as it rotates. The shaft 26 is supported at its right-hand end by a bearing 56 installed within the right-hand end plate 57 of the second housing portion 16. The second rotor 58 and the rotating field structure 32 are the principal components of a second motor 16. The rotatable field structure 32 corresponds to the stator of a conventional motor and is driven to rotate by the first rotor 24.

Figure 3:
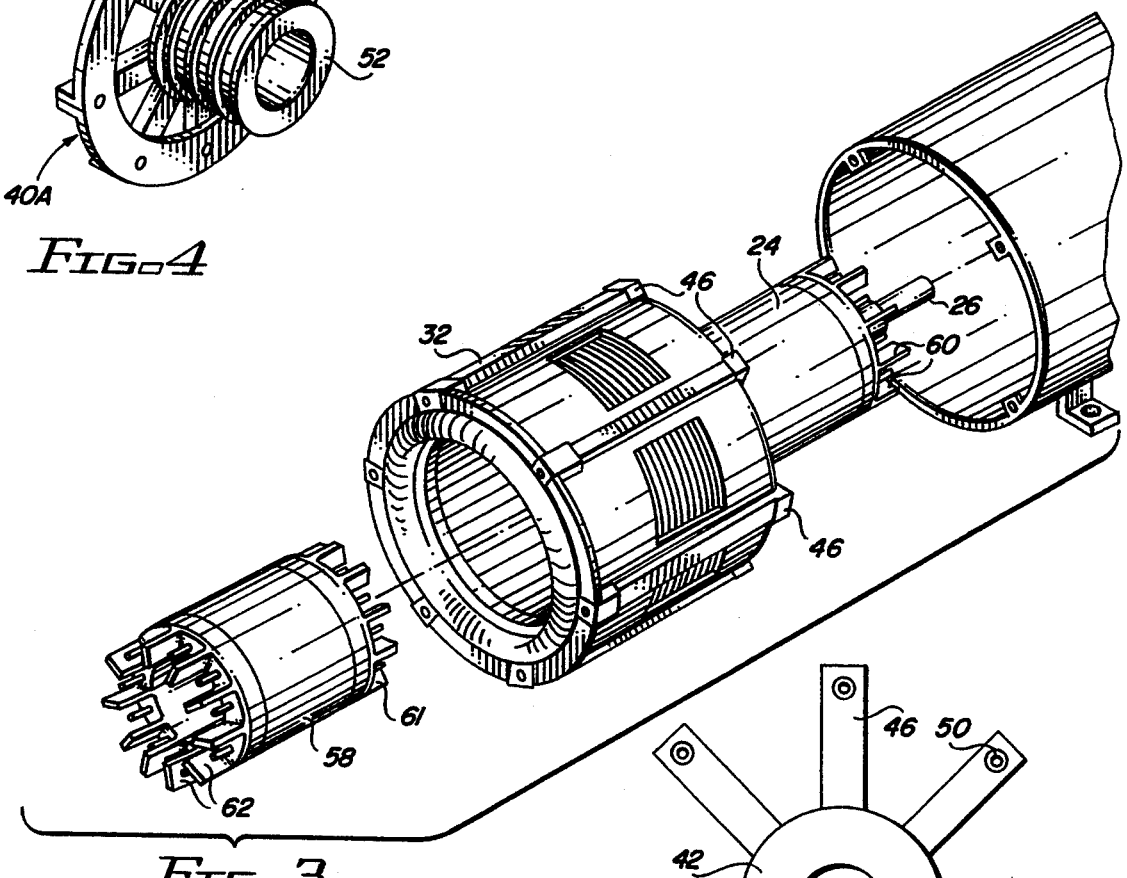
FIG. 3 is an exploded view of an arrangement of FIG. 1, showing the orientation of some of the major components thereof.

The spatial juxtaposition of the major components of the system 10 is shown on the exploded view of FIG. 3, which is oriented in reverse right-to-left order relative to the view of FIG. 2. Shown in FIG. 3 is a portion of the second housing part 16. Also shown are the first rotor 24 and the rotatable field structure 32 attached to it by the spokes 46 of the mounting member 40. Cooling fins 60 of the first rotor 24 and fins 61, 62 of the second rotor 58 are visible in FIG. 3. These fins serve to cool the inside of the composite rotating machine during operation, the circulating air flowing through openings 63 (FIG. 2) and other openings in the end plates 33 and 57.

A plurality of suitably sized pins 34 (FIG. 2) provide a mechanical connection between the sleeve 25 of the first rotor 24 and the mounting member 40. This mounting member 40, represented schematically in FIG. 5, consists of a center portion 42 with a central bore 44 and a plurality of spokes 46 which extend radially from the center portion 42. The spokes 46 of the mounting member 40 are equipped close to their outer ends with bores 48 through which suitable screws 50 are inserted into threaded holes in the rotatable field structure 32 and securely tightened therein. The rotatable field structure 32 is supported at opposite ends by respective mounting members 40 and 41, attached in the fashion just described, which in turn are supported for rotation about the shaft 26 by bearings 28 and 30. A set of slip-rings 52 is mechanically coupled by a plurality of pins 54 to the mounting member 41 to allow for energizing of the winding of the rotatable field structure 32.

Figure 4:
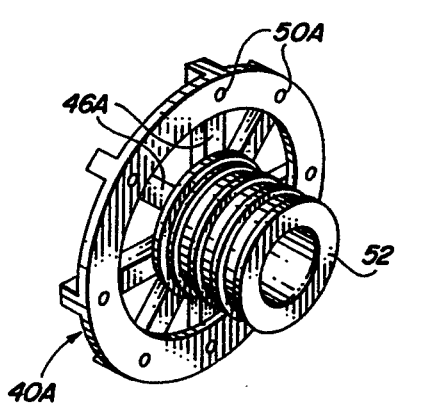
FIG. 4 is a perspective view of one end mount with slip rings which is employed in preferred embodiments of the invention.

FIG. 4 is a view of the mounting member 40A with the slip-ring member 52 attached. This mounting member 40A and corresponding member 40 are mounted to support the rotatable field structure 32 as illustrated in FIG. 2.

The second rotor 58, also of the squirrel cage type, is press-fitted or otherwise affixed to the shaft 26 and mounted for rotation with the shaft inside the bore of the rotatable field structure 32.

When the wound stator 22 is energized by a-c current via conventional lead wires (not shown), it induces an electromagnetic field that causes the first rotor 24 to rotate. Application of 60 cycle a-c power to the stator 22 (assuming a two-pole motor) will cause the first rotor 24 to rotate at a nominal speed of 3600 rpm. Since the rotatable field structure 32 is coupled to the first rotor 24, it also rotates at the same nominal speed of 3600 rpm. Activation of the wound stator 22 without energization of the rotatable field structure 32 therefore results in the shaft 26 being driven at a nominal speed of 3600 rpm through the one-way coupling of the over-running clutch 30. When, however, the winding of the rotatable field structure 32 is also energized with 60 cycle a-c power, the second rotor 58 takes over and drives the shaft 26 at a nominal speed of 3600 rpm relative to the rotatable field structure 32, or 7200 rpm relative to the housing 10. This is possible because, notwithstanding the fact that the first rotor 24 only rotates at 3600 rpm, the over-running clutch 30 allows the shaft 26 to rotate faster than the first rotor 24. This results in a usable shaft speed of nominally 7200 rpm.

The operation of the composite rotating machine has been described here with reference to the combination of two two-pole motors. Different shaft speeds can be achieved by a combination of motors having different numbers of poles as set forth in more detail in Table I above. Furthermore, multiples of separate output shaft speeds, as exemplified in Table II, can be achieved by a combination of three motors, represented in the schematic block diagram of FIG. 10.

In a second embodiment 70 represented schematically in FIG. 6, there is no over-running clutch and thus no driving relationship between the first rotor 24 and the shaft 26. The rotor 24 merely rotates on the shaft 26, and is supported on the shaft by bearings 72 and 74. The second rotor 58 is affixed to drive the common shaft 26 in rotation. The connection of the first rotor 24 via mounting member 40 to the rotatable field structure 32, the support of the rotatable field structure 32 by bearings 76 and 78 on the shaft 26, and the connection of the slip-rings 52 to the mounting member 40A are substantially identical as in the arrangement of FIG. 2. The shaft 26 is supported for rotation in the housing by bearings 77 and 79.

When the wound stator 22 is energized as described above with 60 cycle a-c power, the first rotor 24 rotates at a nominal speed of 3600 rpm (assuming a two-pole winding). Applying a-c power to the two-pole windings of the rotatable field structure 32 with the first rotor 24 rotating at 3600 rpm results in the shaft 26 being driven at a nominal 7200 rpm. However, if d-c power is applied instead of a-c power to the windings of the rotatable field structure 32, the second rotor 58 locks rotation with the rotatable field structure 32 and is thus driven at a nominal 3600 rpm, which results in the shaft 26, affixed to the rotor 58, being driven at a nominal 3600 rpm.

These modes of operation are schematically illustrated in the block diagram of FIG. 7. The broken lines between the first motor 12, second motor 16 and slip rings 52 symbolize the mechanical connection between the components, as described in detail above. The three solid lines between the slip rings and second motor 16 symbolize the electrical connection of the slip rings 52 to the rotatable field structure of the second motor 16. When the wound stator 22 of the first motor 12 is energized with 60-cycle a-c power from the a-c source 67 and the rotatable field structure 32 of the second motor 16 is also energized through the slip rings 52 and switch 68 with 60-cycle a-c power from source 67, the output shaft 26 will rotate at 7200 rpm. When, in the alternative through operation of the switch (68), d-c power from source 69 is used to energize the rotatable field structure 32, the second rotor 58 locks rotation with the rotatable field structure 32 and the shaft 26 therefore is driven only at a nominal speed of 3600 rpm.

FIG. 8 shows a third embodiment 80 of the present invention. The wound stator 22 is, as described above, conventionally mounted in the first housing part 12. The first rotor 24 is affixed to the shaft, which in this embodiment is not a common shaft extending throughout the entire composite rotating machine, like the shaft 26 shown in FIGS. 2 and 6, but consists of two parts, a first shaft 82 and a second shaft 84, coupled by a collar bearing 86 which allows rotation of each shaft independent of the other shaft. As an alternative arrangement, the adjacent shaft ends may be formed with a pilot bearing on one extending into a central bore in the other. The first shaft 82 is supported for rotation in the first housing part 12 by bearings 87 and 88. The rotatable field structure 32, contained in the second housing part 16, is in this embodiment mounted at the inner end to a spoke member 40 which is keyed to the inner end of the first shaft 82 by a Woodruff key 90. A corresponding member 40A at the other end of the rotating field structure 32 is supported for rotation on the second shaft 84 by the bearing 89. The slip-rings 52 are attached to the rotatable field structure 32 in the manner described above.

When the wound stator 22 is energized with 60 cycle a-c power, the first rotor 24 turns and drives the first shaft 82 at a nominal speed of 3600 rpm. This rotation is transmitted through the key 90 to the rotatable field structure 32 which, as a result, also rotates at a nominal speed of 3600 rpm. With only the wound stator 22 energized, only the first shaft 82 develops usable shaft speed while the second shaft 84 remains stationary. Applying 60-cycle a-c power to the windings of the rotatable field structure 32 through the slip-rings 52 will cause the second rotor 58 to rotate and to drive the second shaft 84. For the reasons described above in detail, the output speed of the second shaft 84 will therefore be a nominal 7200 rpm. Driving both motors of this embodiment of the invention will thus produce two usable shaft speeds: 3600 rpm at the first shaft 82 and 7200 rpm at the second shaft 84. When, however, in the alternative, d-c power is applied to the rotatable field structure 32, the second rotor 58 locks rotation with the rotatable field structure 32 and drives the second shaft 84 at a nominal 3600 rpm. Thus the composite rotating machine produces the same shaft speed at both shafts 82 and 84.

FIG. 9 is a schematic sectional view representing a variant of the embodiment depicted in FIG. 2. The embodiment of which a portion is represented in FIG. 9 is identical to the embodiment depicted in FIG. 2 except for the substitution of a bearing 130 for the over-running clutch 30 of FIG. 2. The shaft 26 is solid and extends through the composite machine and projects from both ends thereof so that shaft power can be delivered from both ends of the unit. The sleeve 25 projects from the leftward end, as shown in FIG. 9, so that a pulley can be mounted thereon for delivery of shaft power from rotation of the sleeve 25. In this configuration, both ends of the shaft 26 run at the same speed while the sleeve 25 runs at a different speed. In the example of two-pole windings, the sleeve 25 is driven by the rotor 24 to run at a nominal 3600 rpm. With 60 cycle a-c power energizing the second motor (see FIG. 2), the shaft 26 is driven at a nominal 7200 rpm. If power is shut off from motor No. 2, the central shaft 26 remains stationery while the sleeve 25 rotates at 3600 rpm. If d-c power is applied to the second motor, as explained hereinabove, both the shaft 26 and the sleeve 25 rotate at the same shaft speed, nominally 3600 rpm.

FIG. 10 schematically represents a combination 100 of three motors coupled to provide the shaft output speeds indicated in Table II hereinabove. A first motor 112 has a conventional wound stator with the rotor being coupled in the manner shown and described hereinabove with respect to FIGS. 2 and 6, for example, to a second motor 116 and a third motor 118. Motor 116 is shown with an output shaft 120. Similarly, motor 118 is shown with an output shaft 122. The broken lines extending between the first motor 112 and the other two motors symbolize a mechanical coupling to a rotating field structure in each of the motors 116 and 118. The motors 116 and 118 are constructed like the second motor 16 of FIG. 2, for example. In this arrangement, with the rotor of the first motor 112 producing a rotational speed corresponding to the values listed in the first column of Table II above, the second motor 116 and third motor 118 can be operated at the shaft speeds for the various numbers of poles indicated for the corresponding second rotor and third rotor in Table II. Other similar combinations with varying shaft output speeds may be devised by those skilled in the art as suggested by the instant disclosure.

Although there have been described hereinabove specific arrangements of a composite rotating machine in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A composite rotating machine for operating on alternating current electrical power comprising:
   a first motor having a stator and a first rotor, the rotor being supported for rotation about a common central axis under the influence of electromagnetic fields developed in the stator;

a second motor having a rotatable field structure and a second rotor, the rotatable field structure and the second rotor being supported for rotation about said common central axis;

means physically coupling the field structure of the second motor to the rotor of the first motor in driving relationship therewith, said coupling means comprisinq a first spoked hub member mounted for rotation about said shaft between the first rotor and the rotatable field structure and a second spoked hub member at the end of the rotatable field structure remote from said first spoked hub member, wherein said spoked hub members each comprise a central hub supported by bearings on said shaft and a plurality of spoke elements extending radially outward form said hub at substantially equi-angularly spaced positions about the hub, and means affixing each of the spoke elements adjcent its outer extremity to the rotatable field structure;

means for applying a-c power from an external source to the stator of the first motor and to the field structure of the second motor; and at least one output shaft coupled to be driven by the second rotor, whereby the output shaft can be driven at speeds in excess of the synchronous speed of the first motor.

2. The apparatus of claim 1 wherein said output shaft extends along the central axis out both ends of the composite rotating machine.

3. The apparatus of claim 1 wherein said at least one output shaft comprises a pair of shafts extending in line along said central axis, a first one of said pair being coupled to be driven by said first rotor and having an end extending out of one end of the composite rotating machine and a second one of said pair being coupled to be driven by said second rotor and having an end extending out the other end of the composite rotating machine.

4. The apparatus of claim 1 wherein said means for applying a-c power comprises a plurality of slip-rings and means for energizing the rotatable field structure via said slip-rings, 5. The apparatus of claim 4 wherein said means for applying a-c power comprises switching means having a mode for de-energizing the rotatable field structure while a-c power is applied to the stator of the first motor in order to drive said output shaft at the speed of the first rotor.

6. The apparatus of claim 5 wherein said first rotor is coupled to drive said shaft through an over-running clutch such that the output shaft is driven at the speed of the first rotor when the rotating field structure is not energized by a-c power and is driven at speeds greater than the speed of the first rotor when the rotating field structure is energized from a-c power.

7. The apparatus of claim 1 wherein the first rotor is mounted on bearings to permit rotation of the first rotor and of the output shaft independently of each other and wherein the rotatable field structure is supported on bearings to enable rotation of the second field structure with the first rotor.

8. The apparatus of claim 1 further including a cylindrical sleeve which is coaxial with said first rotor and is supported for rotation on said shaft by an over-running clutch, and means mounting the first rotor on the sleeve in driving relationship therewith, the means coupling the rotatable field structure to the rotor of the first motor being connected to said sleeve.

9. The apparatus of claim 1 further including means affixing the hub of said first hub member to a cylindrical sleeve positioned to support the first rotor in driving relationship therewith.

10. The apparatus of claim 9 further comprising means affixing the hub of said second hub member to a slip-ring assembly to develop rotation of the slip-ring assembly with the rotatable field structure.

11. The apparatus of claim 10 further including switching means for alternatively applying zero power, d-c power and a-c power to the rotatable field structure while a-c power is applied to the stator of the first motor to alternatively produce zero shaft rotation, shaft rotation at the speed of the first rotor and shaft rotation at speeds in excess of the first rotor speed.

12. The apparatus of claim 11 further including switching means for applying d-c power to said slip-ring assembly while a-c power is applied to the first motor in order to electromagnetically lock the rotatable field structure to said second rotor and thereby drive said second rotor at the speed of the first rotor.

13. The apparatus of claim 1 wherein said first rotor is mounted on said first shaft in driving relationship therewith and further including means mounting a first one of said hub members to said first shaft in order to drive said first hub member and said rotatable field structure from said first rotor.

14. The apparatus of claim 13 further including bearing means jointly supporting the inboard ends of the first and second shafts for independent rotation about said common central axis.

15. The apparatus of claim 14 wherein the second rotor is affixed to the second shaft in order to drive said second shaft at different output speeds depending on whether the rotatable field structure is energized from a-c power or d-c power.

16. The apparatus of claim 8 wherein said output shaft and said sleeve project from said first motor at the same end thereof, the shaft projecting beyond the end of the sleeve, such that output power may be taken from both the output shaft and the sleeve at the same end of the composite rotating machine at different rotational speeds.

17. The apparatus of claim 1 further including a third motor having a rotatable field structure and a third rotor, the rotatable field structure and the third rotor being supported for rotation about said common central axis, means coupling the rotatable field structure of the third motor to the rotor of the first motor in driving relationship therewith, and means for driving the rotors of the second and third motors at different rotational speeds relative to each other and to the rotational speed of the first rotor.

* * * * *